Oct. 26, 1965   A. J. MALAVAZOS   3,214,095
CHAIN DISCOUNT MECHANISM FOR CALCULATING MACHINE
Filed Jan. 20, 1964   8 Sheets-Sheet 2
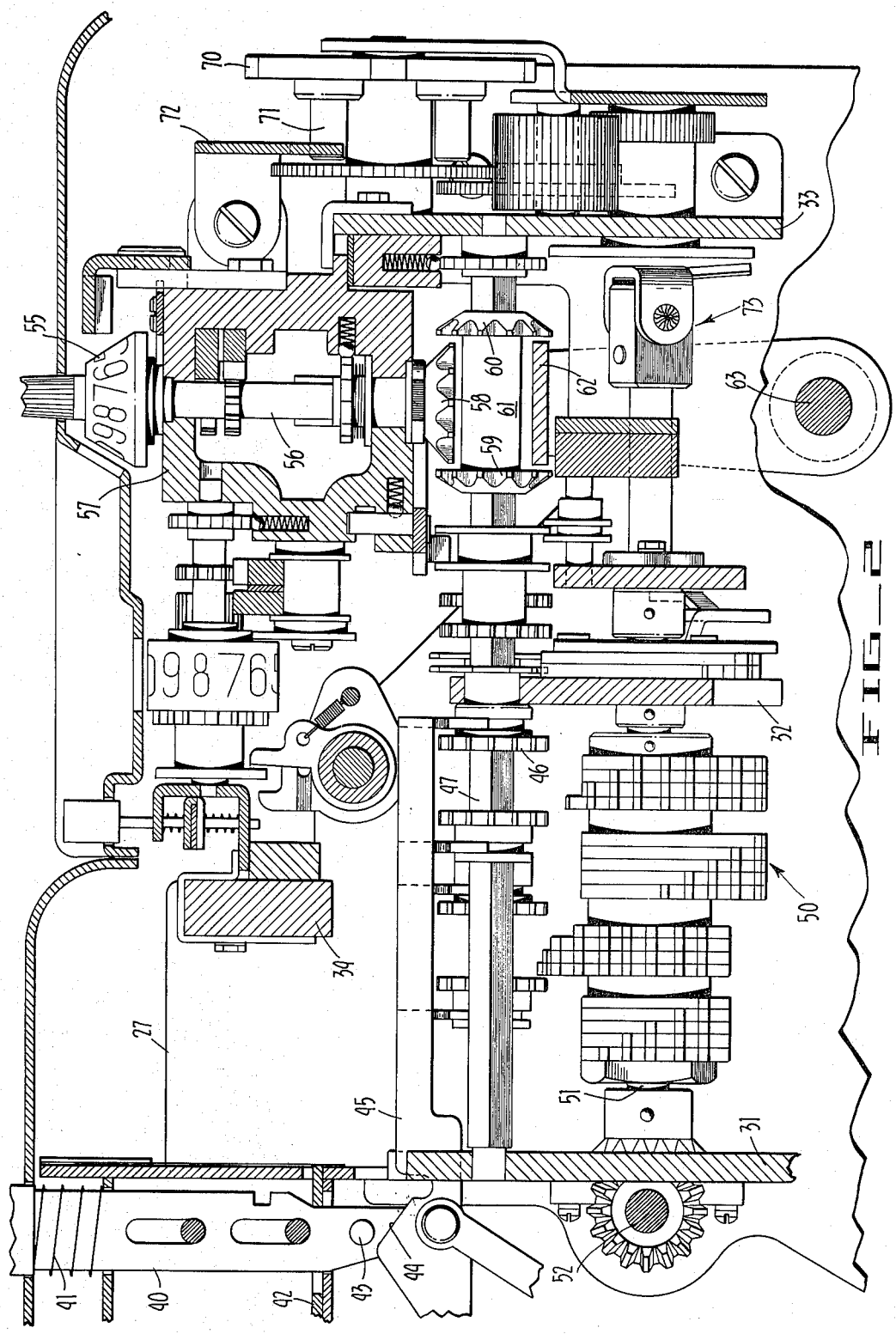
FIG_2

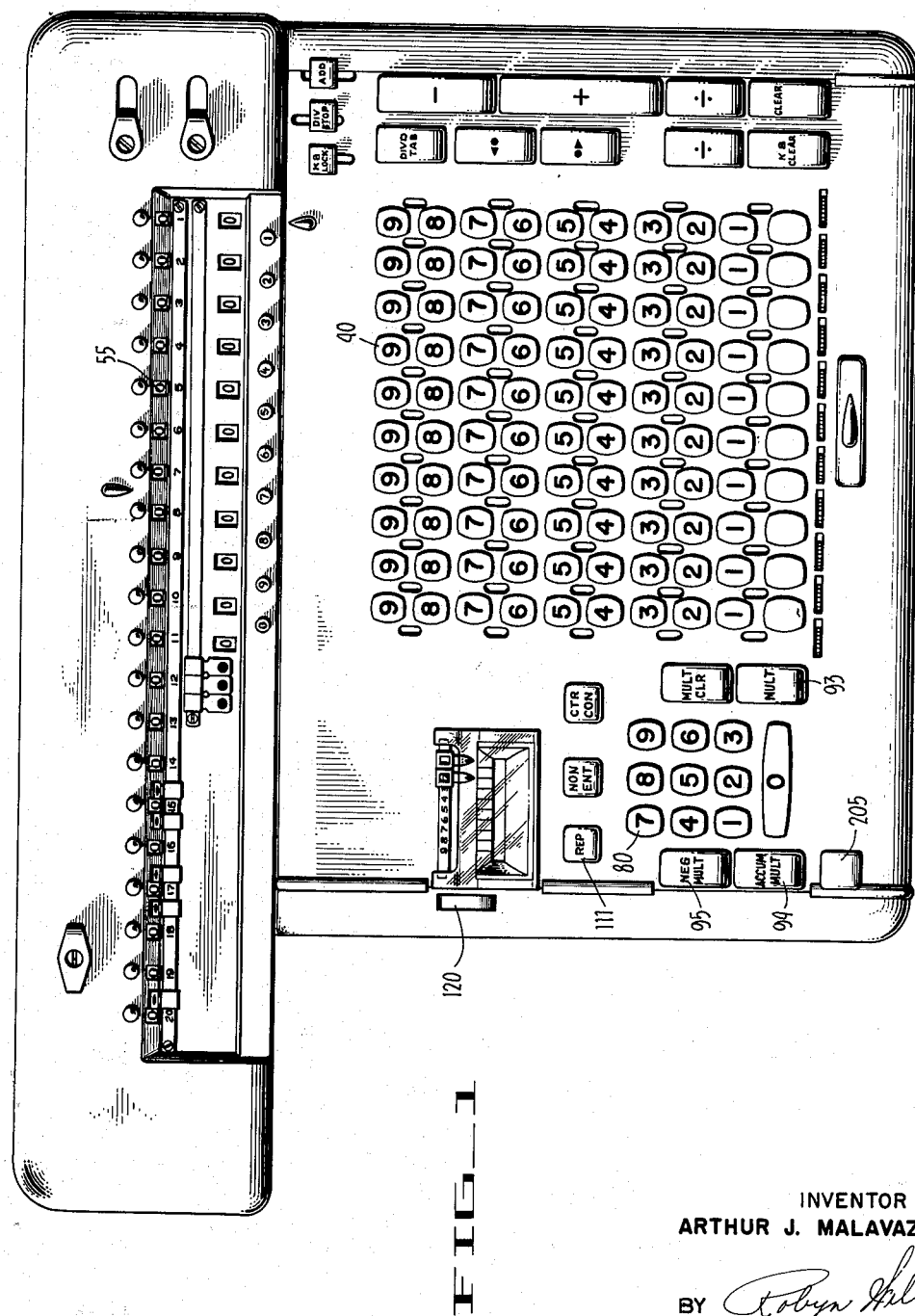
FIG_1
INVENTOR
ARTHUR J. MALAVAZOS
BY
ATTORNEY

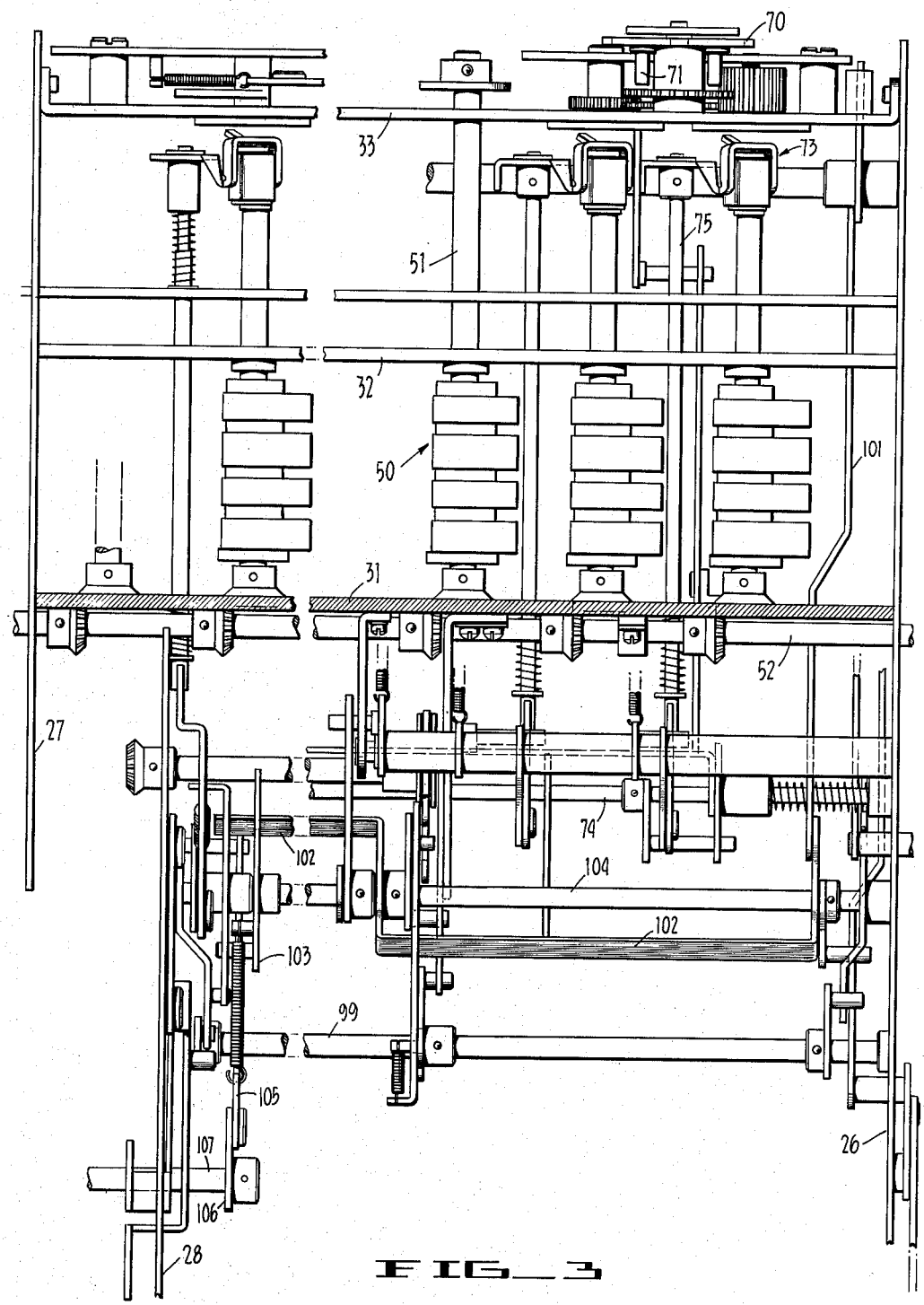
FIG_3

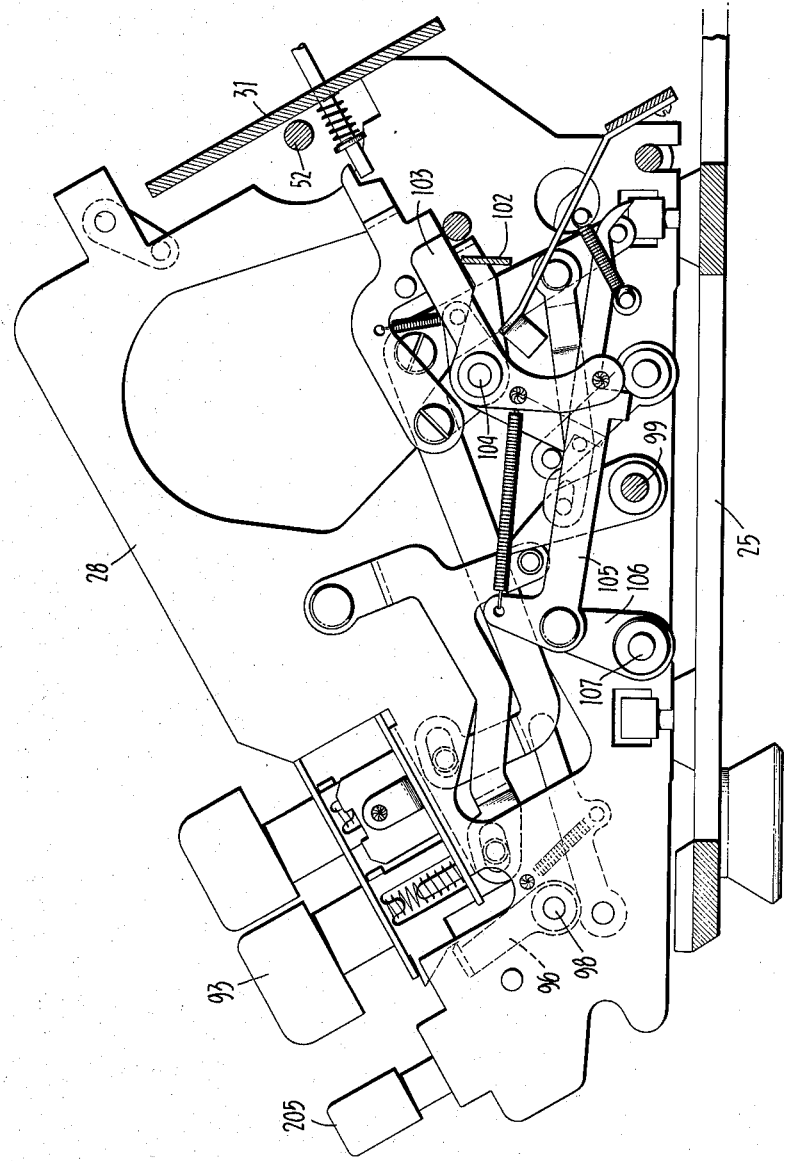

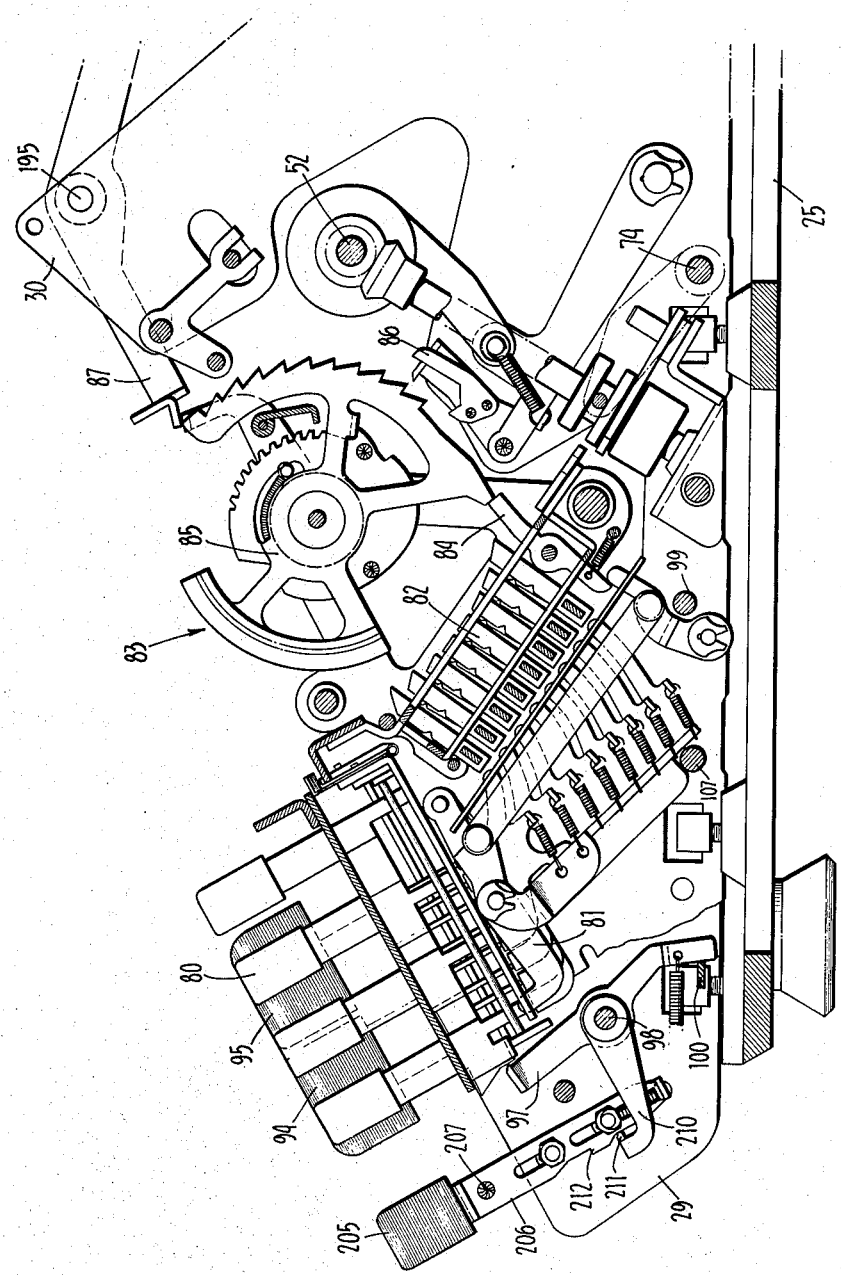

Oct. 26, 1965  A. J. MALAVAZOS  3,214,095
CHAIN DISCOUNT MECHANISM FOR CALCULATING MACHINE
Filed Jan. 20, 1964  8 Sheets-Sheet 6
FIG_6
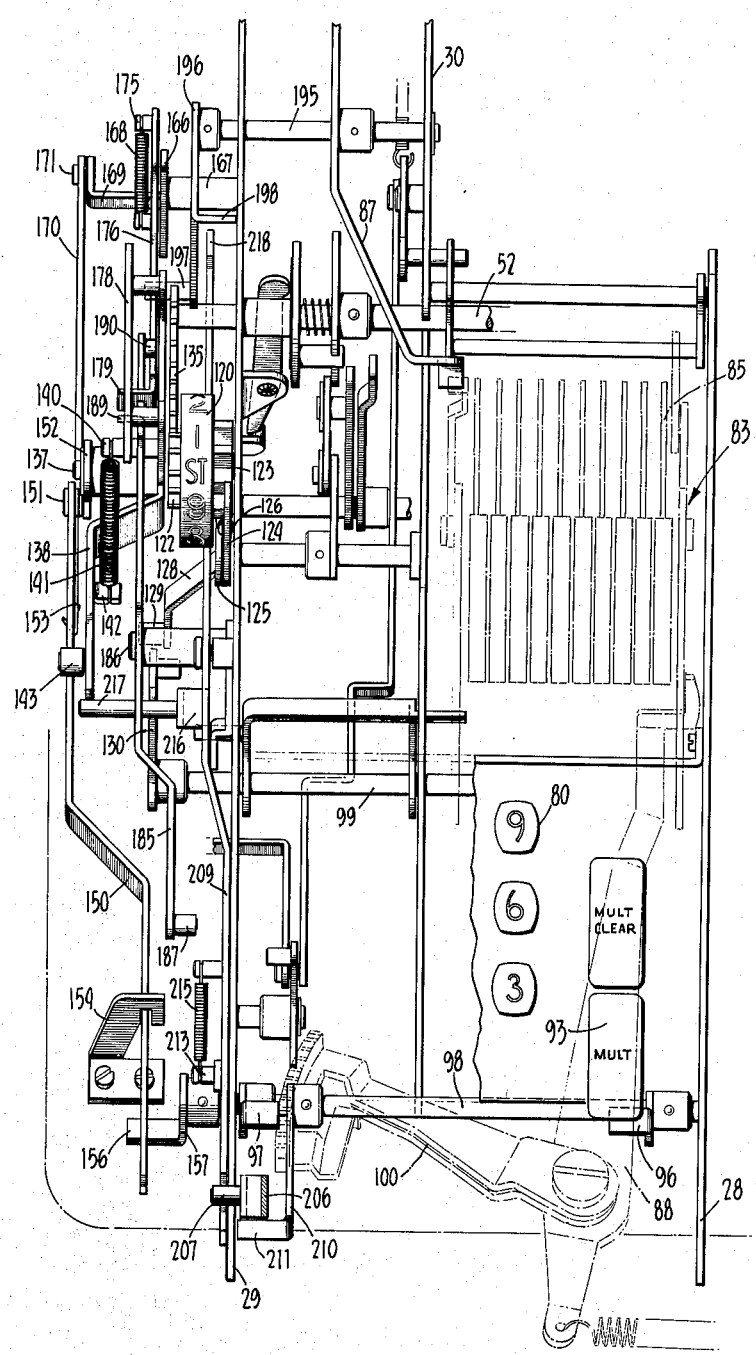

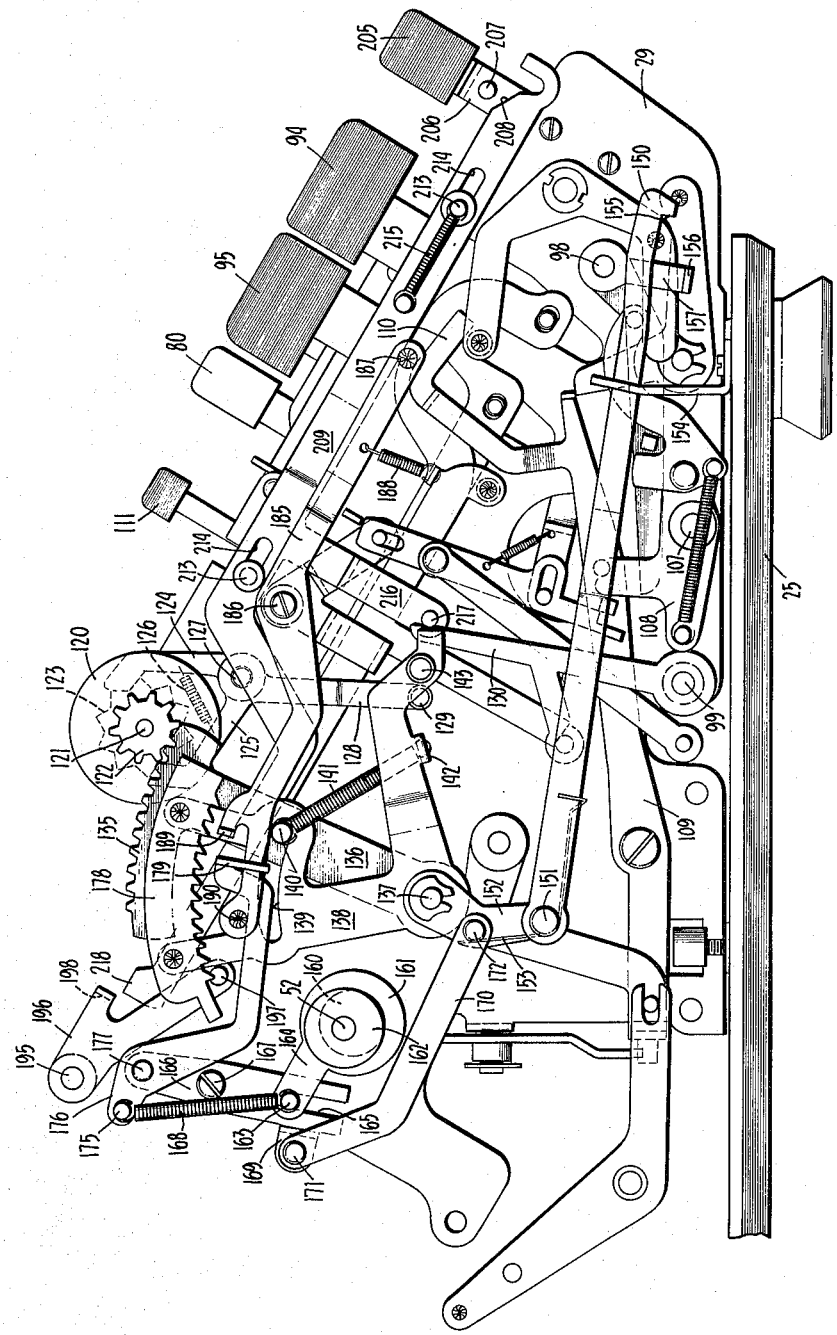
FIG_7

Oct. 26, 1965  A. J. MALAVAZOS  3,214,095
CHAIN DISCOUNT MECHANISM FOR CALCULATING MACHINE
Filed Jan. 20, 1964  8 Sheets-Sheet 8
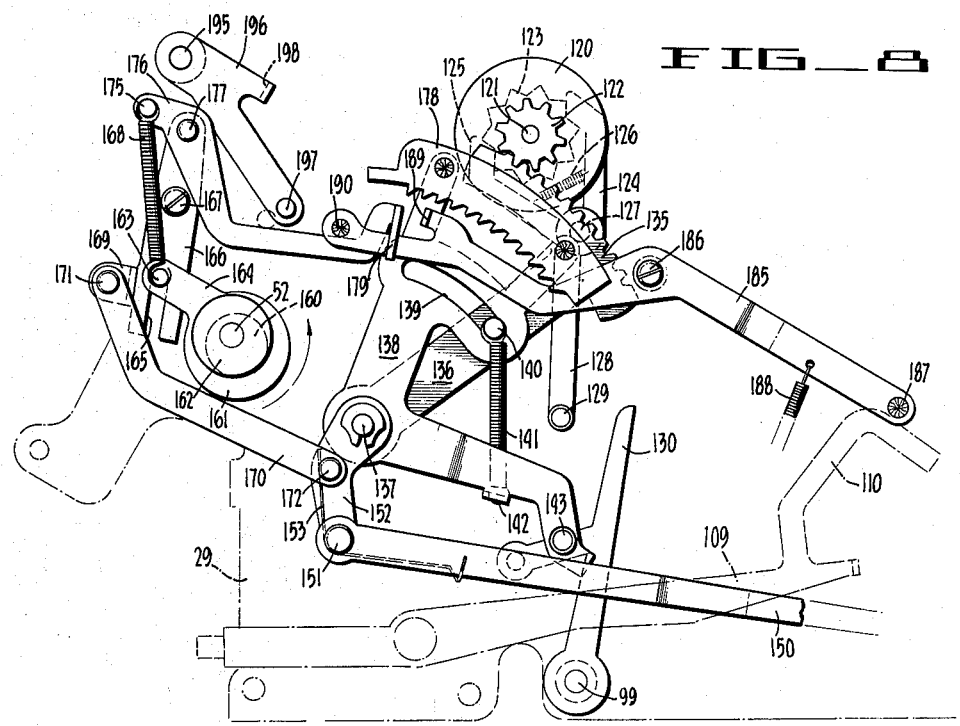
FIG_8
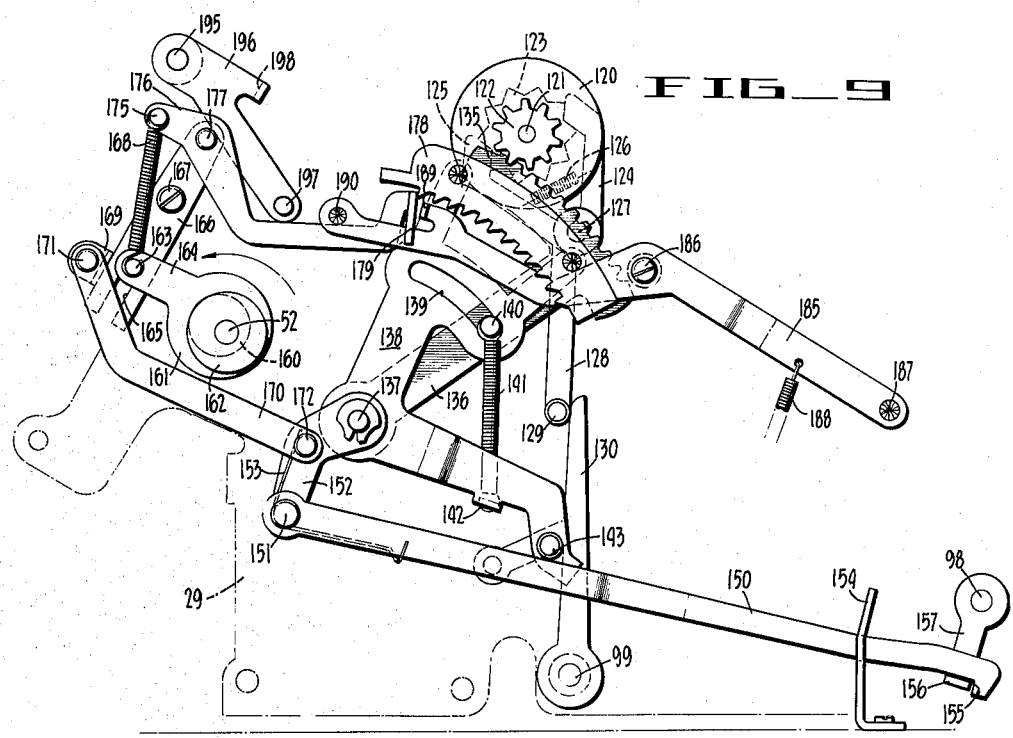
FIG_9

United States Patent Office 3,214,095
Patented Oct. 26, 1965

3,214,095
CHAIN DISCOUNT MECHANISM FOR
CALCULATING MACHINE
Arthur J. Malavazos, Hayward, Calif., assignor to
Friden, Inc., a corporation of Delaware
Filed Jan. 20, 1964, Ser. No. 338,870
7 Claims. (Cl. 235—63)

This invention relates to calculating machines utilizing a multiplication storage mechanism, such as that shown in the patents to Friden, Nos. 2,371,752 of March 20, 1945, and 2,399,917 of May 7, 1946, and provides means whereby two or more small multiplier factors may be stored in the multiplier storage register and used to control a similar plurality of discrete multiplication operations in sequence.

The main purpose of the present invention is to provide a "chain discount" mechanism for controlling a plurality of sequential multiplication operations with the various multiplier factors stored in the multiplier register. By "chain discount" is meant preforming a series of multiplication operations using relatively small multiplier factors. It gets its name from the fact that most such operations are in the preparation of statements in which the price is subject to two or more discounts. Normally sellers prefer to list a series of discounts, which are figured consecutively in each case using the discounted total as the basis for the next discount. Thus a discount of 25%, 10% and 7% is not a discount of 42% but 33.04%, for the 10% discount is figured on 80% of the value, etc. Heretofore, these various discounts have either had to be entered into the machine separately and the operations performed individually, one operation at a time; or the biller had to compute the total discount and use that as a factor without showing the intermediate values. The primary purpose of the present invention is to provide a means whereby in a machine such as those disclosed in the two Friden patents above-mentioned (or the modifications thereof, more recently shown in the patents to Plunkett, No. 2,935,254 of May 3, 1960, or Malavazos, No. 3,090,554 of May 21, 1963). The various discounts (the 25%, 10% and 7% in the above example) are entered in inverse order into the multiplier storage register as discrete factors. The first depression of the multiply key will cause the computation of the first discount of 25%; the second depression of a multiply key will cause a computation using a discount of 10% and the third depression of a multiply key will effect the third computation using a discount of 7%, after which the multiplier storage register is in its home position and the machine is again ready for use. It is assumed that such a mechanism would normally be used with a repeat multiplier mechanism, such as that shown in the patents to Ellerbeck, No. 2,794,595 of June 4, 1957, or Plunkett et al., No. 2,824,695 of February 25, 1958; and with a "back-transfer" mechanism, such as that shown in the patents to Ellerbeck, Nos. 2,714,989 of August 9, 1955, or 3,003,-690 of October 10, 1961, Davis et al., No. 3,032,263 of May 1, 1962, or Malavazos, Nos. 2,909,320 of October 20, 1959, or 3,045,907 of July 24, 1962.

Another primary object of the present invention is to provide an improved multiplier mechanism of the type shown in the Friden patents above-mentioned.

These and other objects of the present invention will be readily apparent to those skilled in the art from the following description of the preferred embodiment of the invention taken in connection with the accompanying drawings, in which:

FIG. 1 is a plan view of the machine used for the preferred embodiment of the invention.

FIG. 2 is a cross-sectional view taken along a vertical, longitudinal plane showing a portion of the selection mechanism, the actuating mechanism and the registers of the machine shown in FIG. 1.

FIG. 3 is a cross-sectional plan view of the machine shown in FIGS. 1 and 2 showing particularly the carriage shifting and register clearing mechanisms, and means for initiating a multiplication operation when the carriage has been returned to its home position.

FIG. 4 is a right side view of the multiplier mechanism showing particularly the means for initiating multiplication after the carriage has been returned to its home position.

FIG. 5 is a cross-sectional view taken on a vertical, longitudinal plane extending through the multiplier mechanism.

FIG. 6 is a plan view of the multiplier mechanism shown in FIG. 5 and showing the mechanism of the present invention.

FIG. 7 is a left side view of the multiplication mechanism of the machine shown in FIG. 1, showing particularly the parts added thereto to effect chain discount operations.

FIG. 8 is a detailed view of the chain discount control mechanism when set for only a single order multiplication, with the parts shown in their normal position prior to the initiation of multiplication.

FIG. 9 is another detailed view similar to FIG. 8, but with the parts shown in the position they occupy during the last (in this instance, the only) digitation cycle of a multiplication operation.

(I) REGULAR MECHANISMS

The machine with which the present invention is preferably associated has been shown and described so often that it is believed unnecessary to do more than very briefly sketch the pertinent mechanisms at this time. Reference can be made to the patents mentioned above, but more particularly to the patent to Friden, No. 2,229,889 of January 28, 1941. It can be noted that the machine is mounted upon a frame which normally comprises a base plate 25 (FIGS. 4, 5 and 7), a right side frame 26 (FIG. 3), a left side frame 27 (FIGS. 2 and 3), an intermediate frame plate 28 (FIGS. 3, 4 and 6), a left side control plate 29 (FIGS. 5, 6 and 7) and an auxiliary frame plate 30 (FIGS. 5 and 6). The frame plates are rigidly affixed to the base plate 25 by the usual means and the right side frame 26 and the left side frame 27 are rigidly interconnected by means of crossbars 31, 32, 33 and 34 (FIGS. 2 and 3). Most of the operating mechanisms are mounted upon the framing composed of these side frames and crossbars.

(1) *Selection mechanism (FIGS. 1 and 2)*

The selection mechanism is of the type shown in the various patents mentioned, and includes an ordinal array of value keys 40 which are arranged in value banks as shown in FIG. 1. Each of these keys is normally biased to a raised and inoperative position by any suitable spring, such as spring 41 (FIG. 2). When depressed to a value position, a key is latched therein by a normal latching slide 42, engaging a notch in the key stem. A pin 43 on the lower end of the key stem engages the appropriate one of a series of incrementally inclined cam faces 44 of a V-notch, or selection, bar 45. In the preferred embodiment of the present machine, there are two such selection bars 45 in each order of the keyboard, one serving the "1" to "5" keys and the other serving the "6" to "9" keys. The rear end of each selection bar 45 is formed with a laterally extending yoke engaging an annular notch in the hub of a corresponding selection gear 46. In each order the two selection gears 46 are slidably mounted upon a common selection, or square, shaft 47 which is journalled in the crossbars 31 and 32.

(2) Actuator (FIG. 2)

The actuator shown in that of the well-known Thomas-type machine and includes, in each order, a mutilated drum actutor 50 which, in the preferred form of invention, is divided into two sections, one to serve the "1" to "5" keys and the other to serve the "6" to "9" keys. Preferably two such drums 50 are mounted on a common actuator shaft 51 which lies between each pair of orders, and carries one drum 50 serving the right-hand order and another drum serving the left-hand order as shown. All the actuator shafts 51 are driven in unison from a common drive shaft 52, which drive shaft is driven in the usual way through a clutch (not shown). It is well understood in the art that the translation of the selection gears 46 along their respective shafts 47 places the selection gear in the plane of a number of teeth on the drum 50 corresponding to the value key depressed. Thereafter the rotation of the common drive shaft 52 is operative to differentially rotate the various selection gears 46 and their respective shafts 47 in accordance with the value placed in the keyboard.

(3) Registers (FIG. 2)

Differential rotation of the ordinal selection shafts 47 is effective to set corresponding values into an accumulator regulator comprising a plurality of ordinally arranged accumulator dials 55. Each of these various register dials 55 is rigidly secured to one of a series of ordinally arranged shafts 56 which are journalled in a carriage frame bar 57. The lower end of each shaft 56 carries a gear 58 rigidly mounted thereon, which gear selectively registers with either a plus gear 59 or a minus gear 60 which are formed integrally on a spool 61. Normally the spool 61 lies in the intermediate position shown in FIG. 2, in which case neither gear registers with the accumulator gear 58. However the spool 61 can be shifted rearwardly to cause additive operation of the accumulator dials 55 or forwardly to effectuate subtractive registration in the accumulator by the usual means of a digitation control bar 62 mounted on a transverse shaft 63.

It is well-known in the art that the accumulator is shiftable with respect to the selection mechanism. In the machine shown in the drawings the carriage is shifted by a mechanism described in the patent to Friden, No. 2,313,817 of March 16, 1943, as modified by the patents to Matthew, Nos. 2,636,678 of April 28, 1953, and 2,679,916 of June 1, 1954. It is, therefore, believed unnecessary to describe the shifting mechanism in detail, but it can be noted that the mechanism does include a shift plate 70 (FIGS. 2 and 3), the pins 71 of which engage slots in a shift rack 72 attached to the frame bar 57. The shift plate 70 is given increments of rotation with each cycle of operation through a gearing shown in FIGS. 2 and 3 but which need not be described as it is adequately mentioned in the patents mentioned. It can be noted, however, that in multiplication the right shift clutch 73 is operated between each ordinal series of operations by the rocking of a shaft 74 (FIG. 3). This shaft is effective to longitudinally shift a clutch control rod 75 to the rear and hence actuate the right shift clutch 73 to cause a single right shift of the carriage.

It is assumed that any machine with which the present invention would be associated would include the various mechanisms common to calculating machines, such as mechanisms for clearing the accumulator dials, a counter register and means for clearing the same, means for controlling the operation of the digitation control shaft 63 in various operations, shifting the carriage, and the like. Since these various mechanisms are not affected by the operation of the present invention, it is believed unnecessary to describe them, reference being made to the patents abovementioned for descriptions of such devices.

(4) Multiplication mechanism (FIGS. 4 to 7)

The preferred embodiment of the present invention preferably utilizes the multiplier mechanism shown in the patents to Friden, Nos. 2,371,752 and 2,399,917, already mentioned. The multiplier mechanism is preferably placed in the lower left-hand corner of the frame of the machine, as shown in FIG. 1, and comprises ten value keys 80 arranged as shown. These keys are mounted in a frame that extends between the intermediate frame plate 28 and the left side control plate 29 (FIG. 4, 5 and 6). The depression of any of these keys is operative, through a corresponding bellcrank 81 (FIG. 5), to set a corresponding pin 82 mounted in an ordinal array in a pin box carried by a multiplier carriage 83. The depression of a value key 80 also simultaneously operates a zero latch 84 to enable a multiplier storage segment 85 to escape to a value position determined by the projected pin 82. The operation of the value keys 80 is also effective to operate an escapement mechanism for the multiplier carriage, not fully shown herein but which is fully described in the patents mentioned.

During a multiplication operation, the segment 85 in the operative order is returned to a "0" position by means of a cyclically operated feed pawl 86 driven synchronously from the main drive shaft 52. When the operative segment reaches its "0" position, it operates a shift control arm 87 that is effective (by means not shown herein but fully described in the patents mentioned) to rock the shift control shaft 74 (FIGS. 3 and 5), to cause a right shift of the accumulator carriage and simultaneously a right shift of the multiplier carriage 83 a single order to the right. After such a shift operation, the machine resumes the multiplication operation in the adjacent order, with the feed pawl 86 operating upon the segment 85 now aligned therewith.

Normally the multiplier carriage 83 is in a home position, one ordinal spacing of the pins 82 and the storage segments 85 to the right of the operative position of the multiplier unit, i.e., the plane of the feed pawl 86. As values are inserted into the storage register, the carriage 83 is escaped a single order to the left. This continues until the multiplier value has been inserted into the storage register. Then, with each ordinal series of operations of the machine in multiplication, the carriage is returned toward its home position. The shifting of the carriage 83 is controlled by the bellcrank 88 (shown in phantom in FIG. 6), and the return of the carriage to the home position (shown in phantom lines in this figure) is effective to terminate the operation and normally restore the various segments 85 to their "0" latched position.

Multiplication operations are controlled by the depression of one of the three multiply control keys: A normal multiplication key 93 (which initiates a clearing operation and a shift of the accumulator register to the left-hand position shown in FIG. 1); an accumulative multiply key 94 (which initiates an additive multiplication operation, including shifting of the accumulator register, but blocking operation of the register clearing mechanism); and a subtractive multiply key 95 (which operates the machine through the multiplication program in a subtractive direction while blocking clearing of the keyboard). The operation of these keys is fully described in the Friden multiplier patents above-mentioned, so that the mechanisms which they operate to control the various multiplying operations need not be described. It will suffice to note that these keys are locked in a depressed position by means of a pair of latching arms 96 (FIGS. 4 and 6) and 97 (FIGS. 5 and 6), both of which are rigidly mounted on a common shaft 98. The two latches are rocked to a releasing position as the multiplier carriage 83 is shifted beyond its home, or inoperative, position by means of the arm 100 of bellcrank 88 (FIG. 6) engaging the tail of latch arm 97 to rock the two latches (counter-clockwise in FIGS. 4 and 5) to release the depressed key. It should also be noted that depression of any of these three control keys is effective to rock an initiating shaft 99 (FIGS. 4 and 7) by means of the linkages there shown but which need not be described in view of the detailed description thereof in the multiplier patents abovementioned.

It has been mentioned that the depression of one of the multiply control keys 93, 94 and 95 is effective to initiate machine operation and to program a left shift of the accumulator to return it to the home position shown in FIG. 1. When this position is reached, a usual shift-terminatnig mechanism is operated which, in operations other than multiplication, not only is effective to disable the shifting mechanism, but also to stop machine operation. In multiplication this override mechanism, which includes link 101 (FIG. 3) and bail 102, normally is effective to initiate multiplication. In the form shown in these figures the override bail 102 underlies a bellcrank 103 (see also FIG. 4) which is pivotally mounted on a transverse shaft 104. A pin on the depending arm of the bellcrank is embraced in a notch formed in an operating link 105. The forward end of this link is pivotally connected to an arm 106 mounted on the right end of a multiplier initiating shaft 107, the left end of which is seen in FIG. 7. The rocking of the bail 102 upwardly (FIG. 4) rocks the bellcrank 103 to pull the link 105 rearwardly, and hence rock shaft 107 (clockwise in FIG. 4 and counter-clockwise in FIG. 7). Such rocking of the shaft removes a latch 108 (FIG. 7) from its engagement with a pin on multiplier initiating lever 109, permitting the lever to rock under the force of a strong spring (not shown herein). Since the mechanism operated and controlled by the operation of this lever 109 is fully described in the multiplier patents above-mentioned, it is deemed unnecessary to describe it again. However, it should be noted that the lever 109 carries an upwardly extending projection 110 which normally disables the feed pawl of the present invention, as will be described shortly in section II, subsection 4.

It is assumed that the multiplier storage register of any machine which the present invention would be associated, would include means for setting the multiplier mechanism for repeat operation. In most instances chain discount operations will be repeated over and over, so that some repeat mechanism is desirable. For this reason I show sketchily a repeat multiplier mechanism of the type shown in the patent to Friden et al., No. 2,376,997. Such a repeat mechanism is normally operated by the forward movement of the repeat key 111 (FIGS. 1 and 7), but it is believed unnecessary to describe the mechanism controlled thereby or its operation.

(II) CHAIN DISCOUNT MECHANISM

The present invention relates to what can most aptly be called a "chain discount" mechanism. Such a mechanism is one that enables the insertion of a number of multiplier factors in the multiplier storage mechanism 85, to be severally operated in sequence. As already indicated this usually finds its most extensive usage in the computing of discounts when several are to be applied to a particular figure. In the normal multiplication mechanism heretofore described, the multiplication operation is continued order-by-order, from the lowest order to the highest, in a continual sequence of operations. In such a mechanism the operation is continued until the carriage has been restored to its home, or inoperative, position. In order to provide a chain discount mechanism, it is necessary to provide an auxiliary means for terminating a multiplication operation at selected points. Obviously, a machine could be constructed in which the stopping points were fixed in the machine at the time of its manufacture, but the present invention shows a preferred form in which the setting of multiplier digits can be controlled at the will of the operator. For example, in the present invention the chain discount mechanism can be completely disabled so that multiplication proceeds in the usual way; or it can be set to stop a multiplication operation after any one of a number of ordinal operations, theoretically from one to nine. Usually, a mechanism of this kind will be set for two or three multiplier digits and hence permit the setting of five or three discount factors in the multiplier unit. Incidentally, it should be noted that I assume that the multiplier storage mechanism carried by the multiplier carriage 83 will contain ten orders of selection segments, so that the present mechanism will provide five two-order multipliers, three three-order multipliers, or two four-order or five-order multipliers.

(1) Setting disk (FIGS. 6 to 9)

In the preferred form of the present invention the number of multiplier digits which can be set for each discount factor is determined by the setting of a wheel 120 (FIGS. 1 and 6 to 9). This disk preferably includes or contains indicia showing the setting of the disk beginning with standard multiplication, as indicated by the letters "ST" in FIG. 6. This setting disk 120 is rotatably mounted on a pivot stud 121 extending to the left from the left side control plate 29. It is formed with an integral ten-tooth gear 122 and an integral star wheel 123. The star wheel 123 is engaged by a pair of arms 124 and 125 which are strongly biased toward each other and into engagement with the star wheel 123 by a suitable spring 126. The two detent arms 124 and 125 are pivotally mounted on a common pivot stud 127 and the detent arm 125 is provided with a depending tail 128. A roller 129 on the lower end of the tail is adapted to engage an arm 130 rigidly secured to the initiating shaft 99, whenever the shaft has been rocked by a depression of any of the multiplier control keys to initiate a multiplication operation. In that event the arm 130 is rocked from the position shown in FIGS. 7 and 8 to that shown in FIG. 9. Thereafter, the detent arm 128 cannot cannot be rocked to disengage the star wheel 123 of setting disk 120. Thus, it is impossible for an operator to change the setting of the setting disk 120 after a multiplication operation has been initiated.

(2) Setting arms (FIGS. 7 to 9)

The gear 122 constantly meshes with a sectional gear rack 135 which is formed on the upper end of the arm 136. This arm 136 is pivotally mounted to the left of the left side control plate 29 by any suitable means, such as pivot stud 137. An auxiliary arm, or live component, 138 also is mounted on the pivot stud 137. Preferably, this live component is formed as a bellcrank as shown, the upper arm being provided with a slot 139 which embraces a pin 140 riveted to, or otherwise rigidly secured on, arm 136. A spring 141 is tensioned between the pin 140 and a seat in an ear 142 formed on the forwardly extending leg of the bellcrank 138. Thus, the positioning of setting disk 120 is effective to rock arm 136 from the normal position shown in FIG. 7 toward the other extreme position shown in FIGS. 8 and 9, and the spring 141 resiliently positions the bellcrank 138 in a corresponding angular position.

The forwardly extending leg of the bellcrank 138 also carries a roller 143 adjacent its forward end. In the normal position of the parts shown in FIG. 7, in which arm 136 and bellcrank 138 are at the extreme counter-clockwise position and the chain discount mechanism is inoperative, the roller lies well above a terminating link 150. However, when the disk 120, and consequently the arm 136 and bellcrank 138, are set at the other extreme position shown in FIG. 8, the roller 143 lies immediately above the terminating link 150. The operation of the terminating link will be described in the next section. At this point it should be noted that the live member, or bellcrank, 138 is, in multiplication operations, fed forwardly (clockwise in FIGS. 7 to 9 from the position shown in FIG. 7 to that shown in FIG. 9). The means for so operating the bellcrank 138 will be described in subsection 4 below. However, for the moment it should be noted that when the setting disk 120 is in the extreme operative position in which a multiplication operation will be terminated after one cycle of operation, the roller 143 lies immediately above the terminating link 150, as shown in FIG. 8, and during that one cycle of operation, the roller 143 will depress the link 150 as shown in FIG. 9.

(3) *Terminating link (FIGS. 6 to 9)*

The terminating link 150 is pivotally mounted on its rear end on a pin 151 secured to the lower end of an arm 152. The arm 152 preferably is pivotally mounted on the pivot stud 137, to the left of arms 136 and 138. A torsion spring 153, looped around pin 151, biases the terminating link 150 upwardly to the position shown in FIG. 7. A slotted guide bracket 154 (FIGS. 6, 7 and 9) limits the upward rocking of the front end of the terminating link 150. The front end of the terminating link 150 is provided with a rearwardly facing shoulder 155. This shoulder 155 is adapted to engage an ear 156 formed on the lower end of an arm 157 pinned to, or otherwise secured on, the left end of the latching shaft 98. It can be noted at this point that the link 150 is constantly reciprocated in machine operation by means explained in the next paragraph. Normally, the shoulder 155 lies above the ear 156, as shown in FIG. 7, so that such reciprocation of link 150 has no effect upon a multiplication operation. However, when the terminating link 150 is depressed by the rocking of bellcrank 138, the shoulder 155 engages ear 156 (as shown in FIG. 9), thereby rocking shaft 98 to release any multiplier key then depressed. Such release of the multiplier key terminates the multiplication operation, as explained in the multiplier patents above-mentioned.

The constant reciprocation of the terminating link 150 is caused by an eccentric cam 160 rigidly mounted on the left end of the drive shaft 52. An enclosed cam follower 161 embraces the eccentric cam 160, being held in engagement with the cam by suitable collars 162. The rotation of the drive shaft 52 (counter-clockwise in FIGS. 7 and 9) causes a reciprocation forwardly and backwardly of the cam follower 161. A pin 163 carried by a leg 164 of the eccentric cam follower 161 is embraced within a slot 165 of a rocker lever 166. The rocker 166 is pivotally mounted on the adjacent control plate 29 by any suitable means, such as a screw stud 167. A relatively strong tension spring 168 is tensioned between the pin 163 and a pin 175 riveted to, or otherwise secured on, the rear end of a feed pawl 176. The feed pawl 176 is pivotally mounted on the rocker 166 by some suitable means, such as pivot stud 177—thereby holding the pin 163 in the upper end of the slot 165 and, of course, simultaneously biasing the feed pawl 176 counterclockwise from the position shown in FIGS. 7 and 8 to that shown in FIG. 9.

A laterally extending bracket 169, formed integrally with the rocker 166, pivotally supports a connecting link 170 which connects the rocker 166 to the arm 152. This link is pivotally mounted on the two members by suitable pins 171 riveted to the bracket 169 and a similar pin 172 riveted to, or otherwise rigidly secured on, the arm 152. Thus, the constant reciprocation of cam follower 161, which occurs when the machine is in operation, causes similar reciprocation of the terminating link 150.

(4) *Adjustment of live interponent 138 (FIGS. 6 to 9)*

The feed, or adjustment, of the live interponent 138 to cause depression of the terminating link 150 at the proper time to terminate a multiplication operation is also effected by the oscillation of lever 166. It has already been mentioned that the feed pawl 176 is pivotally mounted on the upper end of the lever 166 by some suitable means, such as pin 177. This feed pawl extends forwardly a distance sufficient to enable it to engage the teeth of a feed rack 178 which is rigidly secured on, or formed integrally with, the live interponent 138. The forward end of the feed pawl 176 is provided with a laterally extending ear 179 adapted to engage the teeth of the rack 178. This feed pawl is resiliently biased into engagement with the teeth of the rack 178 by the spring 168 previously mentioned, but is blocked from such engagement by two means: One of which is effective in all operations other than the multiplication operation, and the other of which is operated by the interordinal shifting control which takes place in multiplication.

The first control is preferably operated by the multiplication initiating lever 109 which is latched in the position shown in FIG. 7 in all operations except multiplication, and is rocked (clockwise in this figure) to initiate the actual multiplication operation. A lever 185 (FIGS. 6 to 9) is pivotally mounted on a suitable stud 186 extending from the control plate 29. A pin 187 secured to the forward end of this lever is adapted to engage the upper projection 110 of the initiating lever 109. Thus, when the lever 109 is latched in the inoperative position shown in FIG. 7, the lever 185 is held in the counter-clockwise position shown in FIGS. 7 and 8. On the other hand, when the lever 109 is permitted to drop to initiate multiplication, the lever 185 is enabled to drop under the force of its spring 188. The rear end of the lever 185 is formed with an ear 189 which serves as a holding pawl, as it also is adapted to engage the teeth of ratchet 178 whenever the lever 185 is rocked to the clockwise position shown in FIG. 9. A second pin 190, riveted on the rear end of the lever 185, engages the upper edge of the feed pawl 176, whereby the feed pawl 176 is held in the disengaged position shown in FIGS. 7 and 8 when the lever 185 is rocked to the counter-clockwise position shown in those figures by the latching of the initiating lever 109. However, when the initiating lever 109 is permitted to fall to initiate a multiplication operation, and lever 185 is enabled to rock clockwise to the position shown in FIG. 9, it enables the feed pawl 176 to rise to engage the teeth of rack 178.

It was previously mentioned that the interordinal shift of the carriage and the multiplier storage device was initiated by the rocking of the shift control arm 87 (FIG. 6) which is lifted by the return of the operative multiplier storage segment 85 to the "0" position shown in FIG. 5. The rocking of the shift control lever 87 (clockwise in FIG. 5 or counter-clockwise if viewed from the left as in FIGS. 7 to 9) is also utilized to control the operation of the feed pawl 176. The shift control lever 87 is rigidly mounted on a shaft 195 which extends between the control plate 29 and the auxiliary frame plate 30 (FIG. 6). On its left-hand end the shaft 195 carries a bellcrank member 196. The lower leg of this bellcrank 196 carries a pin 197 which is adapted to engage the upper edge of the feed pawl 176. Whenever the shift control lever 87 is engaged by a multiplier segment 85 and is lifted to the position shown in FIG. 5, the pin 197 will allow the feed pawl 176 to rise to engage the teeth of rack 178. This condition occurs only when the multiplication program requires a register shift, so that only at that time is the feed pawl enabled to engage rack 178 and hence operate the live interponent 138. That is, the feed pawl can be operative only during the shifting cycle of operation. However, when the shift control lever 87 is permitted to drop, as it does when the oeprative order multiplier segment 85 registers a value other than "0" (the shift lever 87 rocking counter-clockwise in FIG. 5 and clockwise in FIGS. 7 to 9), the pin 197 will depress the front end of feed pawl 176. By this means the feed pawl 176 is enabled to operate the live interponent 138 only during the register shifting cycles of a multiplication operation. Hence the feed pawl 176 is disabled by lever 185 in all operations except multiplication, and by the bellcrank 196 in all multiplication operations except the shifting cycles.

It will be recognized from the foregoing description that when the machine is set for operation on chain discounts, the arm 136 is set to the desired ordinal spacing, thereby positioning the live interponent 138 accordingly. Then, in each shifting cycle of a multiplication operation, the live interponent 138 is fed one step forwardly (clockwise in FIGS. 7 to 9). When the live interponent 138 is returned to its extreme forward position (shown in FIG. 9), roller 143 thereupon depresses the terminating link 150, causing it to engage ear 156 of arm 157 and hence rock the shaft 98 (clockwise in FIGS. 7 and 9 or counter-clockwise in FIGS. 4 and 5). Interlocks customary in machines of this type provide that the cycle will be completed before machine operation is terminated.

It is believed obvious that the release of the multiplier key latch 96 or 97 will terminate the multiplication operation. Thereafter the new multiplicand factor will be set in the main keyboard keys 40—as by a "back-transfer" operation. Then the depression of one of the control keys 93, 94 or 95, will initiate the second multiplication operation, with its preliminary shifting, or shifting and clearing, operation that precedes the actual multiplication operation.

(5) Skip mechanism (FIGS. 5, 6 and 7)

It is sometimes desirable to skip one of the discounts that might be entered in the machine, as occasionally a customer will be entitled to only a portion of the usual discounts for which the machine could be set. In the mechanism of the present invention such "skip" operations are readily secured by depression of a skip key 205 (FIGS. 5, 6 and 7). This key is mounted on the upper end of a key stem 206 mounted on the right side of the control plate 29 in the usual manner (see FIG. 5) for vertical movement. This key stem carries a pin 207 adapted to engage the cam edge 208 (FIG. 7) of a notch formed in the forward end of a link 209. This key stem 206 is adapted to be latched in an operative (depressed) position by a latching arm 210 (FIG. 5) that is mounted on shaft 98, an ear 211 on the forward end of the arm being adapted to engage a shoulder 212 on the key stem. The link 209 is mounted on the control plate 29 by suitable pin-and-slot mountings, such as pins 213 (FIG. 7) affixed to the control plate engaging slots 214 formed in the link. A spring 215 tensioned between one of the pins 213 and a stud affixed to the link resiliently biases the link to the forward, inoperative position shown in FIG. 7.

The link 209 carries a downwardly projecting arm 216 (FIG. 7) on the lower end of which is riveted a long pin 217 (see also FIG. 6). In the normal position of link 209 shown in FIG. 7 this pin 217 just abuts the arm 130 which is mounted on the operation-initiating shaft 99. This arm 130 is rocked (counter-clockwise in FIG. 7) by operation of either of the multiplier keys 94 or 95. The depression of the "skip" key 205, through the rearward translation of link 209, will have the same effect, as pin 217 also rocks arm 130. By this means the depression of the "skip" key 205 initiates a multiplication operation.

It should be noted that if the setting dial 120 is positioned for standard operation (as shown in FIG. 7), the key 205 cannot be depressed nor the link 209 translated rearwardly. The long pin 217 extends into the plane of the forward end of the live interponent 138 (as shown in FIG. 6). In that event, the pin 217 will engage the forward face of the live interponent 138, and hence blocks operation of the slide 209. This interlock prevents operation of the key 205 when the chain discount mechanism is disabled.

The link 209 extends rearwardly to a point adjacent an ear 198 formed on the upper leg of the blocking bellcrank 196. At its rear end the link 209 carries a blocking face 218 which normally lies just in front of the ear 198 and hence will have no effect upon the operation of bellcrank 196 and shaft 195. However, when the link 209 is pushed rearwardly by depression of the "skip" key 205, the blocking face 218 underlies the ear 198 and hence blocks rocking of bellcrank 196 and shaft 195. This holds the shift control arm 87 in its operating position shown in FIG. 5 and initiates carriage shifting operations and simultaneously enables the forward feed of the live interponent 138. When the live interponent 138 again becomes effective to terminate a shifting operation, the consequent rocking of shaft 98 releases key 205 and the parts are restored to normal.

It is to be understood that this invention is not limited to the apparatus of the patents above-mentioned, as it can readily be adapted to other machines on the market. Further, it is manifest that many modifications and variations of the invention herein set forth may be made by persons skilled in the art without departing from the spirit and scope hereof. Accordingly the above description is to be considered as the preferred embodiment of the invention, and that the invention is not limited thereto but may comprehend other constructions, arrangements of parts, details and features without departing from the spirit of the invention.

I claim:

1. In a calculating machine having a multiplication mechanism including:
   (1) a plurality of ordinally arranged multiplier storage members for storing a multiplier factor,
   (2) means controlled by said multiplier storage members sequentially for controlling the operation of said machine in a continuous series of ordinal operations in multiplication, and
   (3) means operated by the last-to-be-operated multiplier storage member for terminating machine operation, the combination which comprises:
   (4) an auxiliary means for terminating machine operation,
   (5) a member representative of a preselected number of ordinal operations in multiplication, and
   (6) means controlled by said member for operating said auxiliary means.

2. In a calculating machine having a multiplication mechanism including:
   (1) a plurality of ordinally arranged multiplier storage members for storing a multiplier factor,
   (2) means controlled by said multiplier storage members sequentially for controlling the operation of said machine in a continuous series of ordinal operations in multiplication, and
   (3) means operated by the last-to-be-operated multiplier storage member for terminating machine operation, the combination which comprises:
   (4) an auxiliary means for terminating machine operation,
   (5) a member selectively settable from a terminating position to positions representative of a number of ordinal operations in multiplication,
   (6) means operated at the end of each ordinal series of operations for moving said settable member from a set position incrementally toward its terminating position, and
   (7) means operated upon return of said settable member to its terminating position for operating said auxiliary means.

3. In a calculating machine having:
   (1) a selecting mechanism,
   (2) an actuator mechanism,
   (3) a register shiftable with respect to said actuator,
   (4) means for shifting said register, and
   (5) a multiplication mechanism including:
      (a) a multiplier storage register for storing a plurality of ordinally arranged multiplier digits, (b) an indexing means for inserting values into said multiplier storage register, (c) means controlled by said multiplier storage register for controlling the operation of said actuator and said shifting means to multiply a value standing in said selection mechanism by the value in said multiplier storage register, and (d) means operated by the multiplier storage register upon completion of a multiplying operation for terminating machine operation, the combination which comprises:

(6) an auxiliary means for terminating a machine operation, (7) a selectively settable member controlling the operation of said auxiliary terminating means, and (8) means operated by the multiplier mechanism when initiating a shifting operation for moving said settable member from a set position incrementally toward its terminating position.

4. In a calculating machine having:
(1) a selection mechanism,
(2) an actuator mechanism,
(3) a register shiftable with respect to said actuator,
(4) means for shifting said register,
(5) a multiplication mechanism including:
  (a) a plurality of ordinally arranged multiplier storage members for storing a multiplier factor,
  (b) control means controlled by said multiplier storage members in seriatim for controlling the operation of said actuator and said shifting means to multiply a value standing in said selection mechanism by the value in said multiplier storage register, and
(6) means operated by said control means for terminating a multiplication operation, the combination which comprises:

(7) an auxiliary means for terminating a multiplication operation, (8) a selectively settable member having a terminating position for controlling the operation of said auxiliary terminating means, and (9) means operated by the multiplier mechanism when initiating a carriage shifting operation for moving said settable member from a set position incrementally toward a terminating position.

5. In a calculating machine having:
(1) a selection mechanism,
(2) an actuator mechanism,
(3) a register shiftable with respect to said actuator,
(4) means for shifting said register,
(5) a multiplication mechanism including:
  (a) a plurality of ordinally arranged multiplier members for storing a multiplier factor,
  (b) means controlled by said multiplier members sequentially for controlling the operation of said actuator and said shifting means to multiply a value standing in said selection mechanism by the value in said multiplier members,
  (c) a multiplier control key,
  (d) means for latching said multiplier control key in an operative position,
  (e) means operated by the last-to-be-operated for said multiplier members for releasing said latch, and
  (f) means operated by the release of said multiplier control key for terminating machine operation, the combination which comprises:

(6) an auxiliary means for releasing said latch,
(7) a selectively settable member having a latch-releasing position for controlling the operation of said latch, and
(8) means operated by the multiplier mechanism when initiating a carriage shift for moving said settable member from a set position incrementally toward a latch-releasing position.

6. In a calculating machine having:
(1) a selection mechanism,
(2) an actuator mechanism,
(3) a register shiftable with respect to said actuator,
(4) means for ordinally shifting said register,
(5) a multiplication mechanism including:
  (a) a plurality of ordinally arranged members ordinally shiftable as a unit for storing a multiplier factor,
  (b) an indexing means for inserting values into said multiplier storage register and shifting said members ordinally from an inoperative to an operative position,
  (c) means controlled by an operative one of said multiplier storage members for controlling the operation of said actuator to multiply a value standing in said selection mechanism by the value in said multiplier storage register and then operate the shifting means to ordinally shift said register and simultaneously shift said members ordinally toward an inoperative position, and
  (d) means operated by the shift of the highest order member to its inoperative position for terminating a multiplication operation, the combination which comprises:

(6) an auxiliary means for terminating a multiplication operation,
(7) a settable member selectively positionable from a terminating position for controlling the operation of said auxiliary terminating means, and
(8) means operated by the multiplier mechanism when initiating a carriage shift for moving said settable member from a set position incrementally toward its terminating position.

7. In a calculating machine having:
(1) a selection mechanism,
(2) an actuator mechanism,
(3) a register shiftable with respect to said actuator,
(4) means for shifting said register,
(5) a multiplication mechanism including:
  (a) a plurality of ordinally arranged members for storing a plurality of multiplier digits shiftable as a unit,
  (b) an indexing means for inserting values into said members and shifting said members from an inoperative to successive operative positions, and
  (c) means controlled by said multiplier storage members for controlling the operation of said actuator and said shifting means to multiply a value standing in said selection mechanism by the value in said members while returning said members to their inoperative position,
(6) a multiplier control key,
(7) means for latching said multiplier control key in an operative position,
(8) means operated by the release of said control key for terminating machine operation, and
(9) means operated by the return of the members to their home position for releasing said latch, the combination which comprises:

(10) an auxiliary means for releasing said latch,
(11) a selectively settable member controlling the operation of said latch, and
(12) means operated by the multiplier mechanism when initiating a carriage shift for moving said settable member from a set position incrementally toward an operating position.

No references cited.

LEO SMILOW, *Primary Examiner.*